(12) United States Patent
Johnson et al.

(10) Patent No.: US 9,219,668 B2
(45) Date of Patent: Dec. 22, 2015

(54) PREDICTING THE FUTURE STATE OF A MOBILE DEVICE USER

(71) Applicants: Michael Dudley Johnson, San Francisco, CA (US); Joshua Williams, Menlo Park, CA (US)

(72) Inventors: Michael Dudley Johnson, San Francisco, CA (US); Joshua Williams, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 330 days.

(21) Appl. No.: 13/656,531

(22) Filed: Oct. 19, 2012

(65) Prior Publication Data

US 2014/0115146 A1    Apr. 24, 2014

(51) Int. Cl.

| | |
|---|---|
| *G06F 15/16* | (2006.01) |
| *H04L 12/26* | (2006.01) |
| *H04W 4/20* | (2009.01) |
| *G01S 5/00* | (2006.01) |
| *G01C 21/34* | (2006.01) |
| *G08G 1/00* | (2006.01) |
| *G08G 1/0968* | (2006.01) |
| *G01C 21/36* | (2006.01) |
| *H04W 4/02* | (2009.01) |

(52) U.S. Cl.
CPC ........... *H04L 43/0876* (2013.01); *H04W 4/206* (2013.01); *G01C 21/3484* (2013.01); *G01C 21/3617* (2013.01); *G01S 5/0027* (2013.01); *G08G 1/096888* (2013.01); *G08G 1/20* (2013.01); *H04W 4/028* (2013.01)

(58) Field of Classification Search
CPC ........... G01C 21/3484; G01C 21/3617; G08G 1/096888; G08G 1/20; G01S 5/0027
USPC .................. 709/200–205, 217–227, 228, 229
See application file for complete search history.

(56) References Cited

U.S. PATENT DOCUMENTS

| | | | |
|---|---|---|---|
| 6,223,042 B1 * | 4/2001 | Raffel | 455/455 |
| 7,487,918 B2 * | 2/2009 | Kudo et al. | 235/472.01 |
| 7,574,661 B2 * | 8/2009 | Matsuura et al. | 715/745 |
| 7,743,056 B2 * | 6/2010 | Meisels et al. | 707/731 |
| 8,107,974 B2 * | 1/2012 | Robertson et al. | 455/456.5 |
| 8,170,960 B1 * | 5/2012 | Bill | 706/11 |
| 8,180,904 B1 * | 5/2012 | Albanese et al. | 709/228 |
| 8,412,234 B1 * | 4/2013 | Gatmir-Motahari et al. | 455/456.1 |
| 8,458,102 B2 * | 6/2013 | Bill | 706/11 |
| 8,554,873 B1 * | 10/2013 | Ganesh | 709/217 |
| 8,594,061 B2 * | 11/2013 | Kennedy et al. | 370/338 |
| 8,661,121 B1 * | 2/2014 | Mendis | 709/224 |
| 8,706,131 B2 * | 4/2014 | Winters | 455/452.2 |
| 8,718,934 B1 * | 5/2014 | Erdmann et al. | 701/465 |
| 8,812,018 B2 * | 8/2014 | Cooper et al. | 455/456.1 |
| 8,855,681 B1 * | 10/2014 | George et al. | 455/456.3 |

(Continued)

OTHER PUBLICATIONS

Extended EPO Search Report for EP Application 13189171.5, Mar. 5, 2014.

(Continued)

*Primary Examiner* — Moustafa M Meky
(74) *Attorney, Agent, or Firm* — Baker Botts L.L.P.

(57) ABSTRACT

In one embodiment, a method includes accessing data associated with the mobile-computing-device usage of a user; accessing data associated with past user-states of the user, where the past user-states represent previous activities or actions associated with the user's mobile-computing-device usage; predicting a future user-state of the user based, at least in part, on the accessed data; and adapting the operation of the mobile computing device of the user at the future time based on the predicted future user-state.

17 Claims, 5 Drawing Sheets

(56) References Cited

U.S. PATENT DOCUMENTS

| | | |
|---|---|---|
| 2009/0054043 A1* | 2/2009 | Hamilton et al. .......... 455/414.2 |
| 2010/0323715 A1 | 12/2010 | Winters |
| 2011/0320518 A1 | 12/2011 | Tsui |
| 2012/0028650 A1* | 2/2012 | Cooper et al. ............. 455/456.1 |
| 2012/0047102 A1 | 2/2012 | Petersen |
| 2012/0101903 A1 | 4/2012 | Oh |
| 2012/0136856 A1 | 5/2012 | Fitzpatrick et al. |
| 2012/0158289 A1* | 6/2012 | Bernheim Brush et al. .. 701/425 |
| 2012/0163603 A1 | 6/2012 | Abe |
| 2012/0190382 A1 | 7/2012 | Stevens et al. |
| 2012/0221493 A1* | 8/2012 | Bill ................................ 706/11 |
| 2012/0233158 A1 | 9/2012 | Braginsky |
| 2012/0276914 A1* | 11/2012 | Talley et al. .................. 455/450 |
| 2013/0030994 A1* | 1/2013 | Calman et al. .................. 705/40 |
| 2013/0346523 A1* | 12/2013 | Praun et al. ................... 709/206 |

OTHER PUBLICATIONS

International Search Report and Written Opinion for International Application No. PCT/US2013/065551, Jan. 21, 2014.

Australian Patent Examination Report No. 1 for AU Patent Application No. 2013331162 from the Australian Patent Office. Oct. 30, 2015.

* cited by examiner

PREDICTING THE FUTURE STATE OF A MOBILE DEVICE USER

TECHNICAL FIELD

This disclosure generally relates to mobile devices and mobile device users.

BACKGROUND

A mobile device—such as a smartphone, tablet computer, or laptop computer—may include functionality for determining its location, direction, or orientation, such as a Global Positioning System (GPS) receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile devices may also execute software applications, such as games, web browsers, or social-networking applications. With social-networking applications, users may connect, communicate, and share information with other users in their social networks.

SUMMARY OF PARTICULAR EMBODIMENTS

Particular embodiments enable a mobile device to predict a future state of a user of that mobile device. In practice, a mobile device logs information such as the local time reported by the device, the location of the device, or the network connectivity of the device and cross-references that information against historical data to predict a future state of the user of the device. In one embodiment, the mobile device user is a user of a social network and the historical data is drawn from that user's social graph data. Based on a predicted future user state, the mobile device alters its behavior to better meet the future needs or requirements of the user.

In some embodiments, the predicted future user state of the mobile device user can be that the user is commuting to work, that the user is at home, that the user is at work, that the user is having dinner with friends, that the users is in a public social setting, that the user is in a foreign country, or that the user will be connected via a particular telecommunications network. The mobile device uses this predicted state to meet the needs of the user. The mobile device may cache new messages until the user has arrived at her predicted destination. Alternatively, the mobile device may automatically launch a software application related to the restaurant the user is dining at. In particular embodiments, the mobile device may request lower bandwidth services while it is predicted to be connected to a particular telecommunications network. This allows the mobile device to automatically tailor operation to the user's activities.

DESCRIPTION OF EXAMPLE EMBODIMENTS

Figure 1:
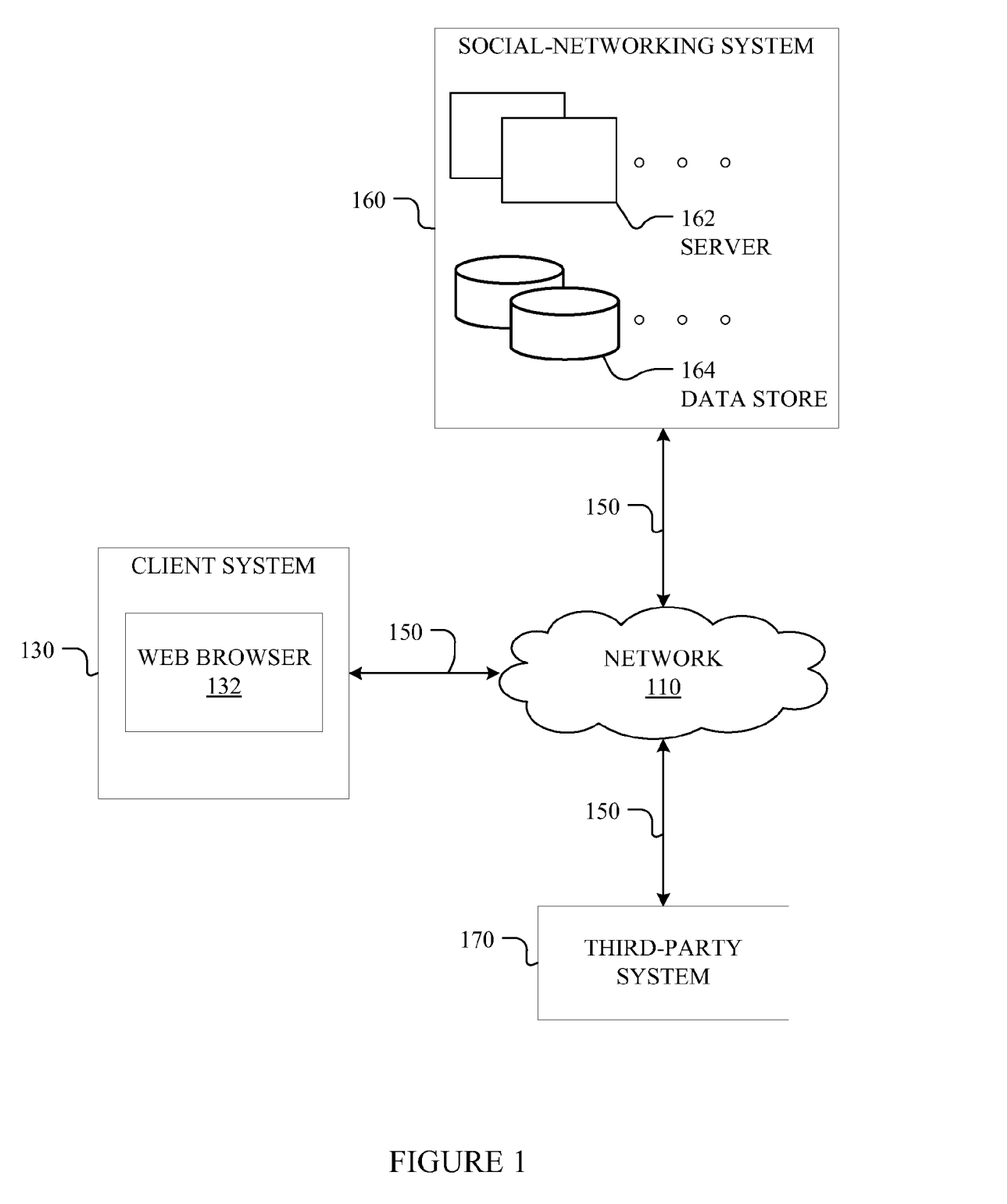
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores 164. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

A geo-social-networking system is a social-networking system in which geographic services and capabilities are used to enable additional social interactions. User-submitted location data or geo-location techniques (e.g., mobile phone position logging) can allow a geo-social network to connect and coordinate users with local people or events that match their interests. For example, users can check-in to a place using a mobile client application by providing a name of a place (or selecting a place from a pre-established list of places). The geo-social-networking system, among other things, can record information about the user's presence at the place and possibly provide this information to other users of the geo-social-networking system.

A social-networking system 160 may maintain a data store 164 of information relating to geographic locations or places. Places may correspond to various physical locations, such as restaurants, bars, businesses, train stations, and airports. A social-networking system 160 may allow users to access information regarding each place using a client application (e.g., a web browser 132) hosted by a client system 130, such as a mobile device. In addition to user profile and place information, the social-networking system 160 may log or maintain other information about the user. For example, the social-networking system may support geo-social-networking system functionality including one or more location-based services that record the user's location. For example, users may access the geo-social-networking system using a special-purpose client application hosted by a client system 130. The client system 130 may automatically access GPS, cellular triangulation, or other geo-location functions supported by the client system 130 and report the user's current location to the geo-social-networking system. A check-in to a given place may occur when a user is physically located at a place and, using a client system 130, access the geo-social-networking system to register the user's presence at the place. A user may select a place from a list of existing places near to the user's current location or create a new place. The user may also identify one or more other users in connection with a check-in (such as friends of a user) and associate them with the check-in as well. For example, a record of the user's check-in activity may be stored in a data store 164.

Still further, a special purpose client application hosted on a mobile device of a user may be configured to continuously capture location data of the mobile device and send the location data to the social-networking system. In this manner, the social-networking system may log the user's location.

In particular embodiments, a data store 164 associated with social-networking system 160 may store an information base of places, where each place includes a name, a geographic location and meta information (such as the user that initially created the place, check-in activity data, and the like). For example, a geographic location of an Internet connected computer or computing device can be identified by the assigned Internet Protocol (IP) address. For example, a geographic location of a cell phone equipped with cellular, Wi-Fi and/or GPS capabilities can be identified by cell tower triangulation, Wi-Fi positioning, and/or GPS positioning. In particular embodiments, the data store 164 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid of the shape. For example, additional information of a place can be business hours or photographs of the place. In particular embodiments, the social-networking system 160 may calculate one or more routes of a user based on the user's user profile information, check-in activities, and/or geographic location data reported by a client application (see above) and store the one or more routes. For example, the social-networking system can calculate a "commute route" of a user between the user's home and work by using a mapping service application, or by using geographic location data points from the user's GPS-equipped mobile phone while the user is driving to work.

Figure 2:
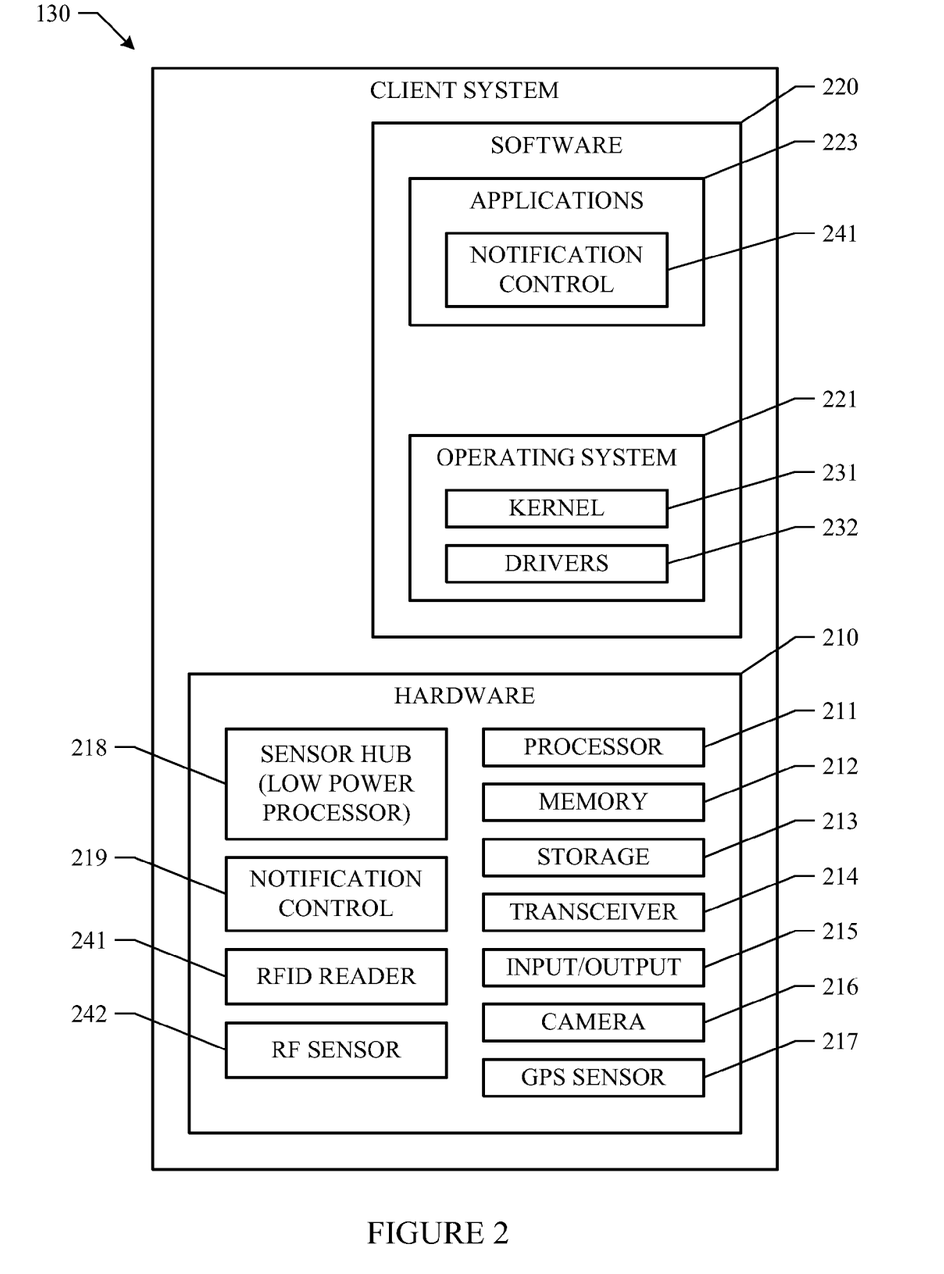
FIG. 2 illustrates an example mobile device.

In particular embodiments, a mobile device (e.g., client system 130) may include hardware, firmware, and software. FIG. 2 illustrates an example mobile-device client system 130. In particular embodiments, client system 130 may be a smart phone (e.g., iPhone or Blackberry), which is a mobile telephone that offers more advanced computing ability and connectivity than a traditional mobile phone. It may be considered as a handheld computer integrated with a mobile phone. In particular embodiments, client system 130 may be a netbook or tablet computer (e.g., iPad). In particular embodiments, client system 130 may be connected to a network through a wireless connection.

In particular embodiments, client system 130 may include hardware 210 and software 220. In particular embodiments, hardware 210 may include any number of hardware components such as, for example and without limitation, processor 211, memory 212, storage 213, transceiver 214, input/output device 215 (e.g., display, touch screen, keypad, microphone, speaker, etc.), camera 216, global positioning system (GPS) sensor 217, sensors hub 218, notification control switch 219, radio frequency identification (RFID) reader 241, radio frequency (RF) sensor 242, and so on. This disclosure contemplates any suitable hardware components. In particular embodiments, some or all of a user's user data may be stored in storage 213.

In particular embodiments, software 220 may include an operating system 221, which may include a kernel 231 and/or any number of device drivers 232 corresponding to some of the hardware components available on client system 130. Operating system 221 may be selected for client system 130 based on the actual type of device client system 130 is. For example, if client system 130 is a mobile device (e.g., a smart phone), then operating system 221 may be a mobile operating system such as, for example and without limitation, Microsoft's Windows Mobile, Google's Android, Nokia's Symbian, Apple's iOS, and Samsung's Bada.

In particular embodiments, one or more software applications 223 may be executed on client system 130. In particular embodiments, they may be native applications installed and residing on client system 130. For example, one application (e.g., Google Maps) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using camera 216; a fifth application may allow the device user to receive and initiate VoIP and/or cellular network calls, and so on. In particular embodiments, there may be a software application (e.g., notification control 241) that enables the device user to manage the notifications pushed to client system 130. Notification control 241 is described in more detail below. Each software application 220 may have a user interface and may implement one or more specific functionalities. Each software application 220 may include one or more software modules implementing the individual functionalities. The executable code of software applications 220, including notification control 241, may be stored in a computer-readable and non-transitory medium (e.g., storage 213 or memory 212) on mobile device 130.

Figure 3:
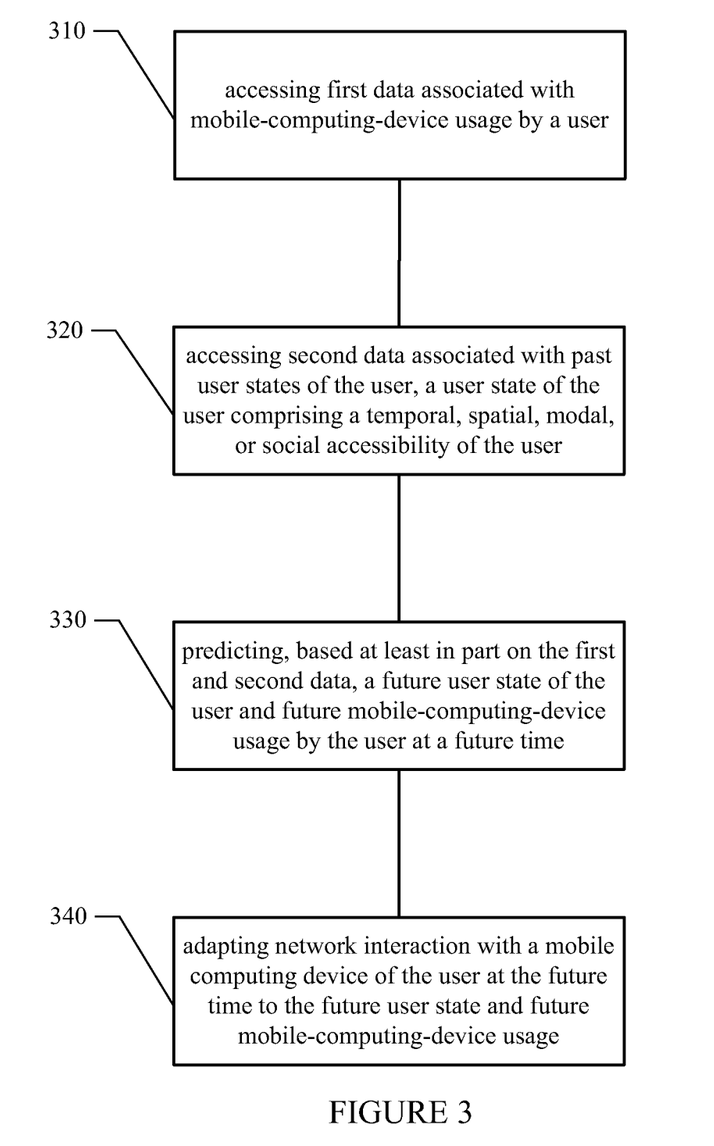
FIG. 3 illustrates an example method of predicting a future state of a mobile device user.

FIG. 3 illustrates an example method for predicting the future user state of a user of a mobile device. The method may start at step 310, where the system accesses data associated with a mobile-computing-device (e.g., client system 130) usage by a user. In particular embodiments, this data may be stored by the social-networking system 160. In particular embodiments, this data may be a unique identifier of the client system 130 or a unique identifier of an application on the client system 130. In particular embodiments, this data may be the Internet Protocol (IP) address of the client system 130. In particular embodiments, this data may be the local time reported by the client system 130. In particular embodiments this data may be the current location or a vector of movement of the client system 130. The location and the vector of movement can be determined via GPS, assisted GPS, cellular triangulation, or any other suitable manner of obtaining the location or vector of movement.

At step 320, the system accesses data associated with the past user states of the user. The past user state may be a temporal, spatial, modal, or social accessibility of the user. In particular embodiments, this data may be stored by the social-networking system 160. In particular embodiments, a past user state may be commuting to and from the user's place of employment. This state would have temporal, spatial, modal, and social aspects relevant to the user. In particular embodiments, the past user state may be attending an event stored by the social-networking system 160. In particular embodiments, the past user state may be traveling in a geographic area connected to information stored by the social-networking system 160. For instance, the user may have posted a status update indicating that the user was on vacation at a time proximate to the user's mobile computing device indicating a location in Hawaii. In particular embodiments, the past user state may be determined from data associated with one of the user's contacts stored by the social-networking system 160. For instance, the user's contact may have previously saved check-in activity data indicating the user and a location. In particular embodiments, the past user state may be connected to the client system 130 currently in use by the user. For instance, the past user state may be that the user was in transit at a time proximate to a received unique client-system identifier indicating that the client system 130 is an in-car navigation unit. As another example, the past user state may be that the user was "working" when the client system 130 was a specific laptop, or that the user was "busy" when the client system 130 was a mobile gaming device.

At step 330, the system predicts a future user state and future client system 130 usage by the user at a future time. In particular embodiments the social-networking system 160 may use a number of geo-social factors. For example, the social-networking system 160 may have developed a dataset of connected user states and client system usage data points by cross-referencing stored data. The social-networking system 160 may also have access to current time or location data for the client system 130. Additionally, the social-networking system 160 may also have stored data concerning future events and calendar appointments of the user. The social-networking system 160 may use one or more of the data accessed in steps 310 and 320 to algorithmically predict future user states.

In particular embodiments, the system may use regression analysis on some or all of the data accessed in steps 310 or 320 to predict the future user state. In particular embodiments, the system may use a linear regression of multiple independent variables to assign probabilities to a number of possible states. An exemplar linear regression may be $y_i = \beta_1 X_{i1} + \beta_2 X_{i2} + \ldots + \beta_p X_{ip}$ wherein $y_i$ represents a possible future state chosen from a set of past user states accessed in step 320, $x_{in}$, represents an independent variable, $\beta_{in}$ represents a weighting factor to be assigned to each variable, and where n spans the values 1 to p. In a particular embodiment, the independent variables may be any of the types of data discussed above in connection with step 310.

In particular embodiments, the system may use a decision-tree analysis on some or all of the data accessed in steps 310 or 320 to predict the future user state. The system may use historical data to develop decision nodes and chance nodes of the decision tree to predict future user states. For example, based on historical data, a certain combination of inputs may predict a user state. If the future local time corresponds with past local times associated with the past user state of "commuting", the current reported client system 130 is an in-car navigation unit, and the current reported location of the client system 130 is on the known commuting path for the user, the system may work through a decision tree to determine that the future user state of the user is commuting to work for a given time period. In particular embodiments, the decision-tree analysis may be desirable in a system with a small number of potential future user states. In particular embodiments the decision-tree analysis may be combined with other prediction techniques.

In particular embodiments, the system may use a neural-network analysis on some or all of the data accessed in steps 310 or 320 to predict the future user state. For example, the system may implement a supervised learning neural network to find a function mapping input variables drawn from the data accessed in step 310 to user-states drawn from the data accessed in step 320. The neural-networking analysis may try to minimize the mean-squared error between the network's predicted user state and known past user states. By minimizing this error, the network is able to develop an approximated function for predicting future user states.

In particular embodiments, the system may use an expert-system analysis on some or all of the data accessed in steps 310 or 320 to predict the future user state. The system may build a knowledge base of the expert system based on historic data. For example, the system may develop a rule that "IF the client system 130 is Laptop001 THEN user is at work". As another example, the system may develop a rule that "IF the current location is Hawaii THEN the user is on vacation". As another example, the system may develop a rule that "IF the current local time is between 7 PM and 6 AM THEN the user is at home". By developing said knowledge base, the system may then run input variables through the expert-system inference engine either in batches or serially to predict future user states.

This disclosure contemplates any suitable manner of predicting a future user state and utilizing any combination of factors accessed in steps 310 and 320 or weighting of factors in the calculation of the predicted future user state.

At step 340, the system adapts the operation of the client system 130 of the user at a future time in response to the predicted future user state, at which point the method may end. In particular embodiments, the predicted user state may be that the user will be travelling in a geographic area. The system may adapt by pushing data relevant to the geographic area to the client system 130. For example, if the predicted user state is that the user will be vacationing in Hawaii, the system can push relevant data (e.g. weather information, travel advisories, restaurant reviews, and taxi cab advertisements) to the client system 130. Some or all of the data can be displayed as notifications to the user. Alternatively, some or all of the data can be cached on the client system 130 and used to pre-populate suggested searches and suggested results, or reduce future data usage by the client system 130.

In particular embodiments, the system for predicting a future state of a mobile device user as illustrated in FIG. 3 may be associated with a social-networking system 160. In this case, the social-networking system may implement the method illustrated in FIG. 3 (e.g., as computer software) and use the method to predict the future user state of users who are also members of the social-networking system 160.

It may be desirable for a social-networking application on the client system 130 to change its operation in response to the predicted user's state. In particular embodiments, the system adapts the operation of the client system 130 by modifying the logical operation of a social-networking application on the client system 130. For example, if the predicted future user state is that the user is unavailable (e.g. on an airline flight, working, watching a film) then the social-networking application on the user's client system 130 can be set to queue all notifications to the user until the predicted future user state changes. As further example, if the predicted future user state is that the user will be out at a public social setting (e.g. attending a birthday party), the social networking application on the user's client system 130 can be set to launch a camera application when accessed.

In particular embodiments, the system adapts the operation of the client system 130 by altering the characteristics of the data requested by the client system 130 and sent by the social-networking system 160. In particular embodiments, it may be desirable for the social-networking system 160 to provide lower bandwidth services to the client system 130 when that device is connected via certain types of links 150. For example, some telecommunications providers offer data download limits and impose fees for exceeding those limits. As another example, some telecommunications contracts charge increased fees for data transfer when travelling in a foreign country. If the predicted future user state indicates that the client system 130 will be connected via a link 150 associated with a data limit or increased fees, the social-networking system 160 may transmit lower bandwidth content. In particular embodiments, it may be desirable to increase an interval at which the social-networking system 160 polls the client system 130 to determine the device's location. For example, if the predicted future user state is that the user will be at home, the social-networking system 160 may adapt by increasing the polling interval to once every hour. By increasing the polling interval, it may be possible for the social-networking system 160 to increase the battery life of the client system 130.

Particular embodiments may repeat the steps of the method of FIG. 3, where appropriate. Moreover, although this disclosure describes and illustrates particular steps of the method of FIG. 3 as occurring in a particular order, this disclosure contemplates any suitable steps of the method of FIG. 3 occurring in any suitable order. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
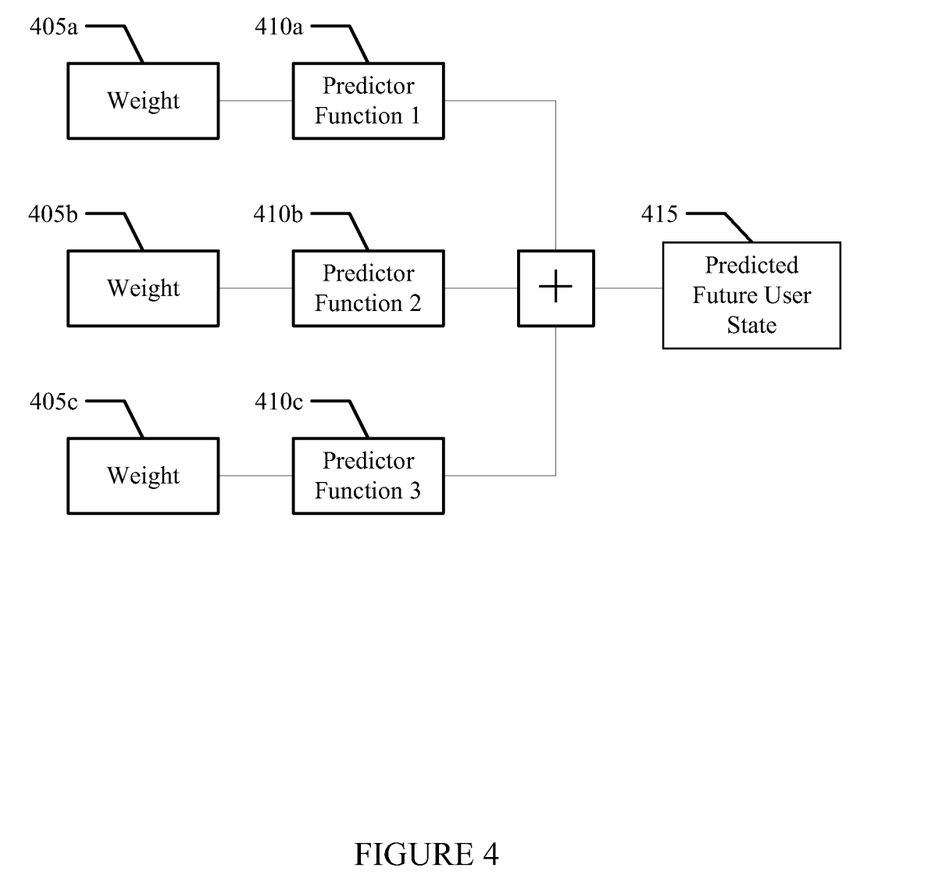
FIG. 4 illustrates an example block diagram of a predictor function.

FIG. 4 is a block diagram of an example function for predicting the future user state. To predict a future user state 415, weights 405 are applied to predictor functions 410 and then combined to obtain a predicted future user state 415. Although FIG. 4 shows three predictor functions 410, any number of predictor functions can be employed in other embodiments of the invention. Additionally, in the embodiment of FIG. 4, the weighted predictor functions 410 are combined linearly. In different embodiments, other forms of combination may be used, including harmonic means, mean squares, and geometric means. Additionally, multiple predicted future user states 415 with varying weights 405 may be computed before adapting the operation of the client system 130 as described in method step 340.

The system may comprise one or more predictor modules (e.g., an application) that are responsible for computing a set predictor function, which predicts a future user state. As discussed above, each predictor function may be any suitable method for predicting a future user state. In some embodiments, the predictor function may be generated using a machine learned algorithm that is trained using a user's historical activity associated with a specific user state. Machine learning is a scientific discipline that is concerned with the design and development of algorithms that allow computers to learn based on data. The computational analysis of machine learning algorithms and their performance is a branch of theoretical computer science known as computational learning theory. The desired goal is to improve the algorithms through experience (e.g., by applying the data to the algorithms in order to "train" the algorithms). The data are thus often referred to as "training data". Each predictor module thus provides a predictor function for each of a set of possible future user states, where a predictor function may take as an input some or all of the data accessed in method step 310 and then outputs a measure of the likelihood that the user will have a predicted future user state.

In some embodiments, one or more of the predictor functions may use a decay factor in which the strength of the signal from a user's historical activity decays with time. Moreover, different predictor functions may decay the historical activity at different rates. For example, some types of predicted future user state, like commuting to work, indicate a more persistent connection than other types of activity that indicate a more ephemeral connection, like attending a non-recurring event (e.g. a wedding). Therefore, the predictor functions may decay the effect of historical activity based on an understanding about how that past user state may become less relevant over the passage of time. Various decay mechanisms may be used for this purpose. For example, a predictor function may use a mathematical function, such as an exponential decay, to decay the statistics about a predicted user state. In another embodiment, the decay is implemented by selecting only those statistics about a user state that occurred within a specific window of time, such as 24 hours or 30 days.

Figure 5:
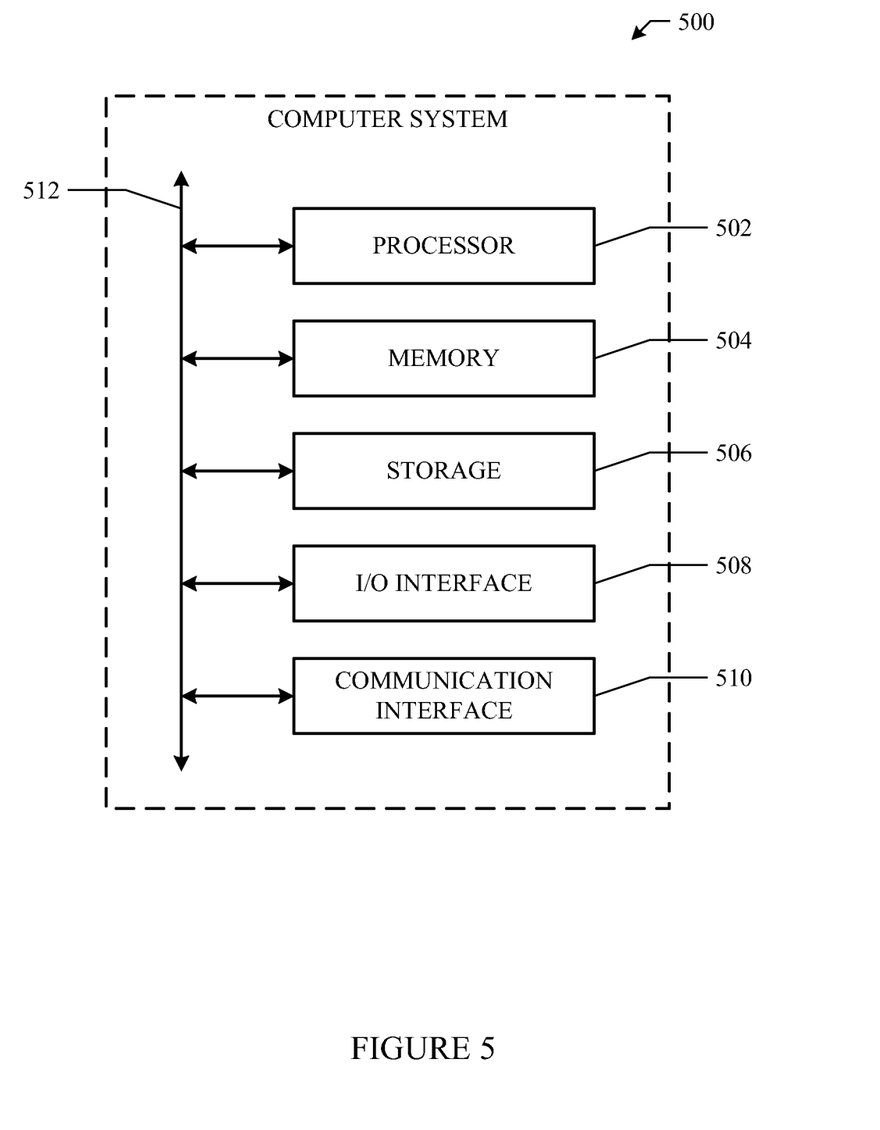
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by one or more computing devices, accessing first data associated with mobile-computing-device usage by a user of a social-networking system;
   by one or more computing devices, accessing second data associated with past user states of the user, a user state of the user comprising a temporal, spatial, modal, or social accessibility of the user;
   by one or more computing devices, predicting, by a weighted set of predictor functions, wherein each predictor function comprises a machine-learned algorithm trained for a particular user state, based at least in part on the first and second data:
      a future user state of the user at a future time, the future user state comprising the
      user traveling within a geographical area; and
      a future mobile-computing-device-usage by the user at the future time;
   by one or more computing devices, adapting the operation of a mobile computing device of the user at the future time to the future user state; and
   by one or more computing devices, adapting network interaction with a mobile computing device of the user at the future time to the future mobile-computing-device usage, the adaptation comprising requesting interaction by the mobile computing device with the social-networking system by automatically selecting social-networking information to push to the mobile computing device of the user relevant to the user traveling within the geographical area.

2. The method of claim 1, wherein:
   the future user state of the user further comprises a location and an activity of the user; and
   requesting interaction by the mobile computing device with the social-networking system further comprises modifying one or more logical operations of a social-networking application on the mobile computing device relevant to the location and activity of the user for access by the user at the future time.

3. The method of claim 1, wherein adapting the operation of the mobile computing device comprises modifying the interaction of a telecommunications network with the mobile computing device to provide wireless connectivity to the mobile computing device.

4. The method of claim 1, wherein:
   the future user state of the user comprises the user commuting; and
   adapting the operation of the mobile computing device comprises requesting content with lower bandwidth requirements for transmission to the mobile computing device while the user is commuting.

5. The method of claim 1, wherein:
   the future user state of the user comprises a location of the user; and
   adapting the operation of the mobile computing device comprises reducing polling of the mobile computing device for its location.

6. The method of claim 1, wherein the future time is proximate to a current time.

7. The method of claim 1, wherein the first data comprises:
   an identifier of the mobile computing device;
   an identifier of an application on the mobile computing device;

an Internet Protocol (IP) address of the mobile computing device;
a location of the mobile computing device
a vector of movement of the mobile computing device; or
a local time reported by the mobile computing device.

8. The method of claim 1, wherein:
the user is a user of a social-networking system, the social-networking system comprising a graph that comprises a plurality of nodes and edges connecting the nodes, at least one node in the graph corresponding to the user; and
the second data comprises social-networking information from the graph associated with the user.

9. The method of claim 1, wherein predicting the future user state of the user comprises:
regression analysis of the first or second data;
decision-tree analysis of the first or second data;
neural-network analysis of the first or second data; or
expert-system analysis of the first or second data.

10. One or more computer-readable non-transitory storage media embodying software that is operable when executed to:
access first data associated with mobile-computing-device usage by a user of a social-networking system;
access second data associated with past user states of the user, a user state of the user comprising a temporal, spatial, modal, or social accessibility of the user;
predict, by a weighted set of predictor functions, wherein each predictor function comprises a machine-learned algorithm trained for a particular user state, based at least in part on the first and second data:
a future user state of the user at a future time, the future user state comprising the
user traveling within a geographical area; and
a future mobile-computing-device usage by the user at the future time;
adapt the operation of a mobile computing device of the user at the future time to the future user state; and
adapt network interaction with a mobile computing device of the user at the future time to the future mobile-computing-device usage, the adaptation comprising requesting interaction by the mobile computing device with the social-networking system by automatically selecting social-networking information to push to the mobile computing device of the user relevant to the user traveling within the geographical area.

11. The media of claim 10, wherein adapting the operation of the mobile computing device comprises modifying the interaction of a telecommunications network with the mobile computing device to provide wireless connectivity to the mobile computing device.

12. The media of claim 10, wherein:
the future user state of the user comprises the user commuting; and
adapting the operation of the mobile computing device comprises requesting content with lower bandwidth requirements for transmission to the mobile computing device while the user is commuting.

13. The media of claim 10, wherein:
the future user state of the user comprises a location of the user; and
adapting the operation of the mobile computing device comprises reducing polling of the mobile computing device for its location.

14. The media of claim 10, wherein the future user state of the user comprises a location and an activity of the user, and the software is further operable when executed to:
further request interaction by the mobile computing device with the social-networking system by modifying one or more logical operations of a social-networking application on the mobile computing device relevant to the location and activity of the user for access by the user at the future time.

15. A system comprising:
one or more processors; and
a memory coupled to the processors comprising instructions executable by the processors, the processors operable when executing the instructions to:
access first data associated with mobile-computing-device usage by a user of a social-networking system;
access second data associated with past user states of the user, a user state of the user comprising a temporal, spatial, modal, or social accessibility of the user;
predict, by a weighted set of predictor functions, wherein each predictor function comprises a machine-learned algorithm trained for a particular user state, based at least in part on the first and second data:
a future user state of the user at a future time, the future user state comprising the
user traveling within a geographical area; and
a future mobile-computing-device usage by the user at the future time;
adapt the operation of a mobile computing device of the user at the future time to the future user state; and
adapt network interaction with a mobile computing device of the user at the future time to the future mobile-computing-device usage, the adaptation comprising requesting interaction by the mobile computing device with the social-networking system by automatically selecting social-networking information to push to the mobile computing device of the user relevant to the user traveling within the geographical area.

16. The system of claim 15, wherein the future user state of the user comprises a location and an activity of the user, and the processors are further operable when executing the instructions to:
further request interaction by the mobile computing device with the social-networking system by modifying one or more logical operations of a social-networking application on the mobile computing device relevant to the location and activity of the user for access by the user at the future time.

17. The system of claim 16, wherein adapting the operation of the mobile computing device comprises modifying the interaction of a telecommunications network with the mobile computing device to provide wireless connectivity to the mobile computing device.

* * * * *